Nov. 14, 1933. W. H. BLEUEL 1,935,309
SPRING FORMING MECHANISM
Filed Jan. 11, 1933  3 Sheets-Sheet 1

Inventor.
William H Bleuel
Seymour Earle Nichols
attys

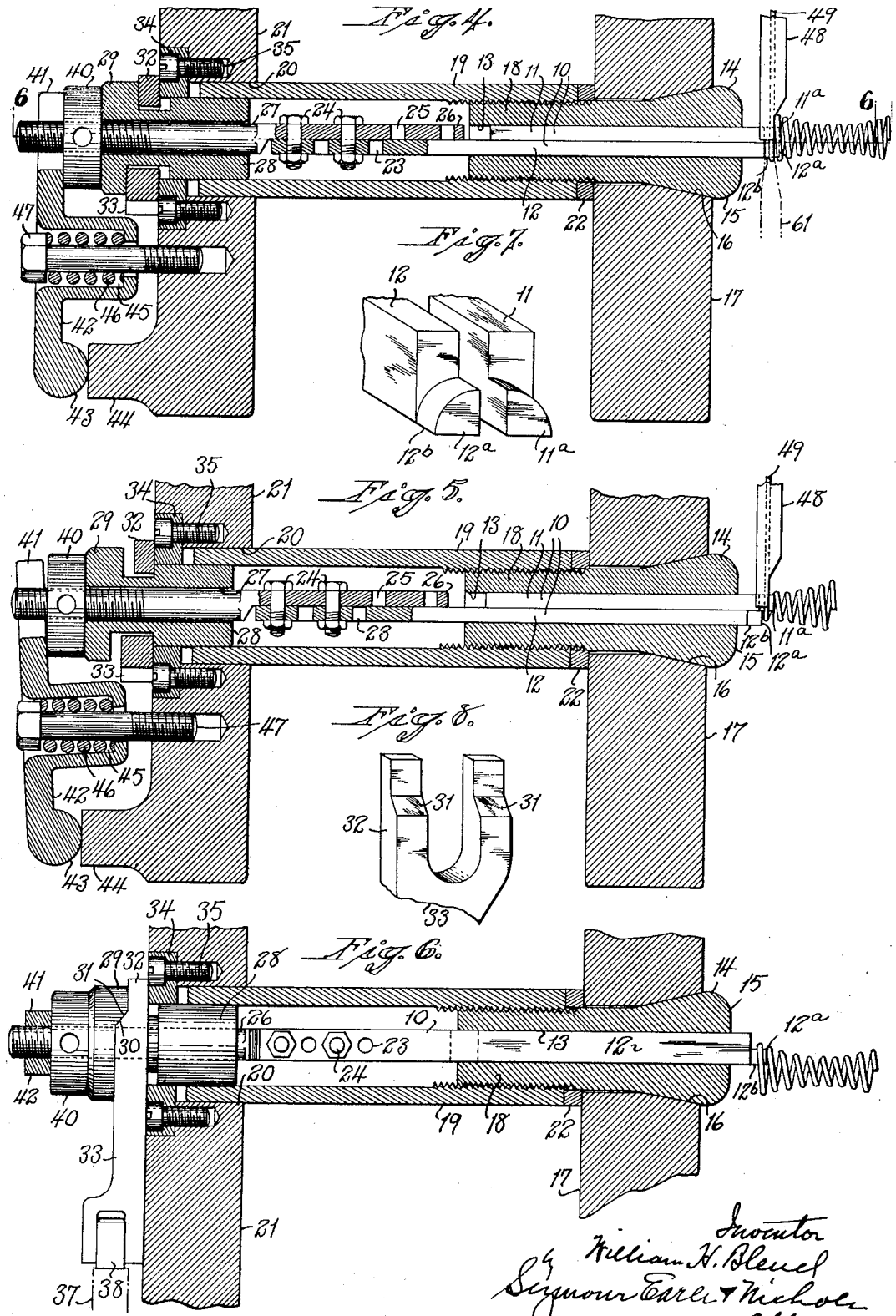

Patented Nov. 14, 1933

1,935,309

UNITED STATES PATENT OFFICE 1,935,309

SPRING-FORMING MECHANISM

William H. Bleuel, Pittsburgh, Pa., assignor to The Wallace Barnes Company, Bristol, Conn., a corporation Application January 11, 1933. Serial No. 651,147

12 Claims. (Cl. 140—78)

This invention relates to an improvement in mechanisms for forming helical springs and particularly helical springs having changing coil diameters, such, for instance, as barrel-shaped springs, cone-shaped springs, hourglass-shaped springs, stepped springs, etc.

Heretofore, in producing mechanisms for forming springs of the above-mentioned type, it has been desirable to employ a relatively-heavy and rugged mandrel-member, with the result that the capacity of the mechanism, with respect to the formation of the smaller convolutions, in particular, has been markedly limited by the character of the mandrel.

One of the objects of my present invention is to provide a mechanism described, by which springs of the general type referred to may be efficiently formed.

Another object of my invention is to provide a mechanism having a relatively-heavy mandrel-member but still capable of forming tapered springs, etc., having smaller convolutions than those ordinarily feasible to form with mandrels of such relatively-heavy type.

Other objects will be apparent to those skilled in the art from the following, taken in conjunction with the accompanying drawings and the appended claims.

In the accompanying drawings:

Fig. 4 is a broken transverse sectional view taken on the line 4—4 of Fig. 2;

Fig. 5 is a similar view taken on the line 5—5 of Fig. 1;

Fig. 6 is a longitudinal sectional view taken on the line 6—6 of Fig. 4;

Fig. 7 is a broken prospective view of the forward ends of the complementary mandrel-members;

Fig. 8 is a broken perspective view of the bifurcated end of the retracting-arm; and Fig. 9 is a perspective view of the mandrel-operating head detached.

Figure 1:
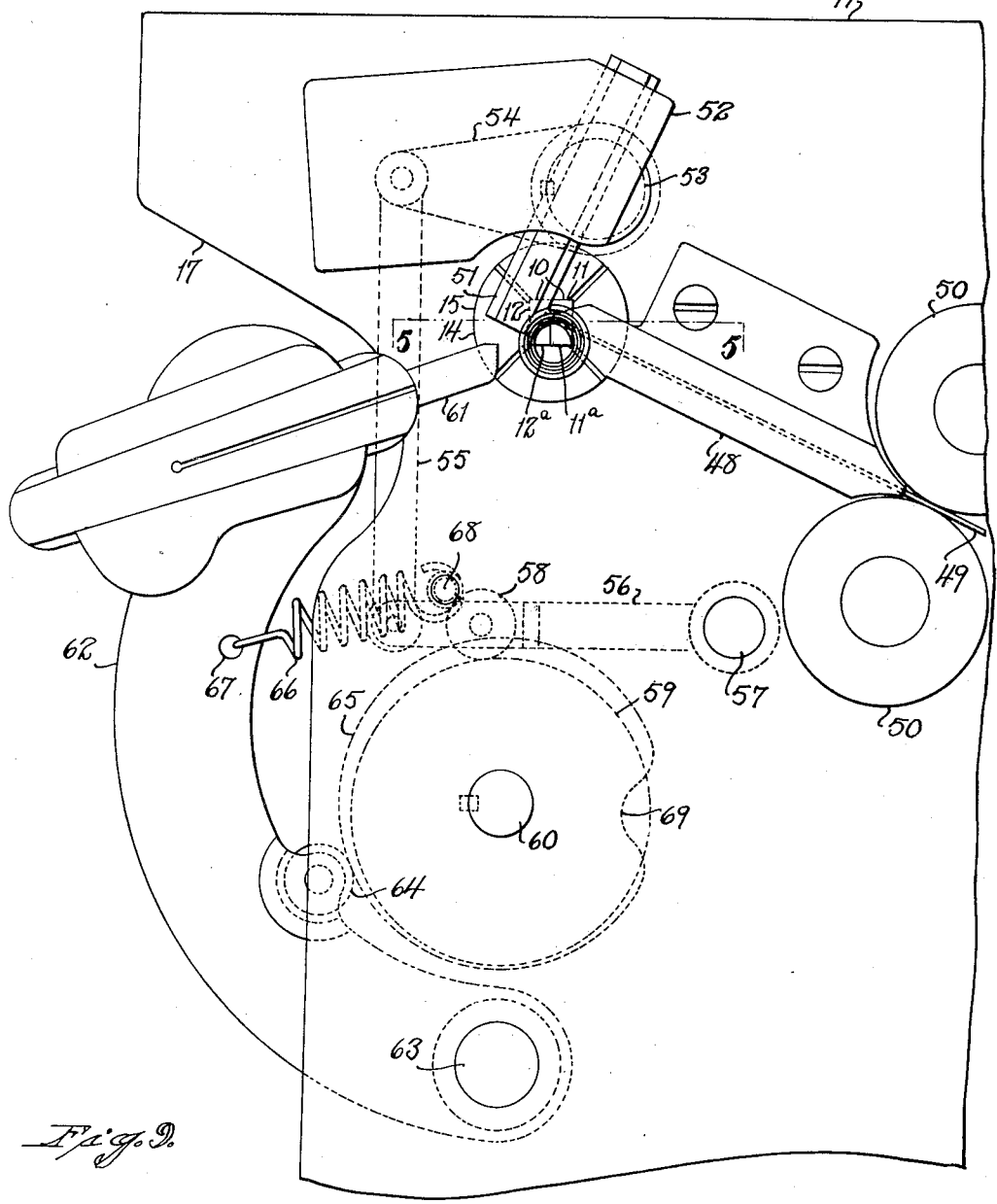
Fig. 1 is a broken view in front elevation of a spring-forming mechanism embodying my invention and showing the deflecting-tool moved inwardly near the limit of its inward travel and one of the mandrel-members retired.

In the particular spring-forming mechanism herein chosen for the illustration of my invention, I employ an arbor generally designated by the numeral 10 and including two complementary arbor-members 11 and 12, both cooperating in the formation of a helical spring, as will hereinafter appear, and one of which (12) is axially retirable with respect to the other.

The arbor-members 11 and 12 project outwardly through a rectangular bore 13 in a clamping-collet 14 having the usual externally-tapered and split head 15 seating in a tapered-socket 16 in a front frame-member 17. The arbor-members 11 and 12 are proportioned with respect to each other so that when the head 15 of the collet 14 is compressed, only the arbor-member 11 will be gripped thereby, while the arbor-member 12 will be free for reciprocating movement with respect thereto for the purpose as will hereinafter appear.

The collet 14 is provided with an externally-threaded stem 18, as shown, and with which is engaged the internally-threaded forward end of a sleeve 19 having its rear end bearing in a bore 20 in a rear frame-member 21 complementing the frame-member 17 just referred to. The sleeve 19 serves to draw the split head 15 of the collet 14 against the tapered-bore 16, and for that purpose it has threaded engagement with the stem 18 of the said collet and bears at its extreme forward end against a spacing-collar 22, which in turn bears against the rear face of the frame-member 17.

The rear end of the arbor-member 12 is formed with a plurality of transverse perforations 23 any two of which are adapted for the reception of coupling-bolts 24 passing through any given two of a plurality of transverse perforations 25 formed in the forward end of an extension-member 26 passing outwardly through an axial bore 27 in an operating-head 28 slidably mounted within the bore of the sleeve 19 before referred to.

The operating-head 28 has the inner face of its head 29 formed at substantially diametrically-opposite points with sloping cam-surfaces 30—30 periodically engaged, as will hereinafter appear, by correspondingly-sloped cam-surfaces 31—31 formed in the bifurcated end 32 of a pivotal operating-arm. The inner face of the bifurcated end 32 of the said arm 33 bears against a retaining-collar 34 recessed into the rear face of the frame-member 21 and secured therein by screws 35. The retracting-arm 33 is hung for pivotal movement upon a stud 36 and is periodically operated by a retracting-cam 37 operating against a roller 38 carried by the said retracting-arm 33 and normally held in engagement with the said cam 37 by a helical spring 39.

The outer face of the head 29 of the operating-head 28 bears against an adjusting-nut 40 threaded upon the outer cylindrical end of the extension-member 26. Bearing against the outer face of the adjusting-nut 40, for the purpose of yieldingly forcing the members 26 and 12 forwardly, is the bifurcated free end 41 of a lever 42 having its opposite end formed with a cylindrical boss 43 bearing against a lug 44 rearwardly offsetting from the frame-member 21.

Intermediate its ends the lever 42 is formed with a spring-pocket 45 housing a helical spring 46 which latter encircles an adjustable stud 47 rearwardly projecting from the frame-member 21. The said spring bears at its forward end against the bottom of the spring-pocket 45 and at its outer end against the under side of the head of the stud 47 and exerts a constant effort to swing the bifurcated end 41 of the lever 42 forwardly so as to correspondingly move the members 26 and 12.

The mandrel-members 11 and 12 are respectively formed at their forward end with substantially quadrantal forming-projections 11ª and 12ª. Both of the projections 11ª and 12ª participate in the formation of a spring and the lower outer corner 12ᵇ of the latter, in addition, acts as a cut-off edge, as will hereinafter appear.

In accordance with usual practice in forming helical springs, I employ a quill or guide 48 secured to the front face of the frame-member 17 and provided longitudinally with a guide-way through which wire 49 is fed by means of the usual feed-rollers 50—50.

The guide 48 directs the wire 49 over the upper surface of the projections 11ª and 12ª into engagement with a movable deflecting-tool 51 mounted in an oscillating deflector-head 52 carried at the forward end of a shaft 53 extending through and journaled in the frame-member 17. The rear end of the shaft 53 has secured to it a laterally-offsetting arm 54 to which is pivotally connected a link 55 in turn pivotally connected at its lower end to the free end of a lever 56. The said lever 56 is pivotally mounted at its opposite end upon a stud 57 rearwardly offsetting from the frame-member 17 and carries intermediate its ends a roller 58 bearing against the periphery of a circular diameter-control cam 59 eccentrically positioned upon a cam-shaft 60 adjacent the opposite end of which latter is secured the cam 37 before referred to.

Cooperating on occasion with the lower outer corner 12ᵇ of the forming-projection 12ª of the mandrel-member 12 is a cut-off tool 61 normally held in retired position, as shown in Fig. 1, and adjustably carried at the upper end of a cut-off arm 62 pivotally mounted upon a stud 63 rearwardly offsetting from the front frame-member 17. Intermediate its ends, the said cut-off arm 62 mounts a roller 64 held in engagement with the periphery of a cut-off cam 65 by a helical spring 66 having one end hooked through an aperture 67 in the arm 62 and having its opposite end hooked over a stud 68 offsetting from the frame-member 17.

The cut-off cam 65 just above referred to is mounted upon the cam-shaft 60 which carries the cams 37 and 58 before referred to. The said cut-off cam 65 is formed in its periphery with a notch 69 into which the roller 64 is abruptly moved by the spring 66 as the cam revolves.

Figure 2:
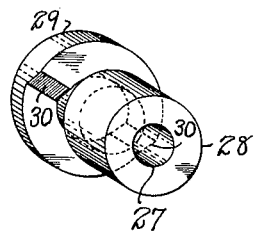
Fig. 2 is a view corresponding to Fig. 1 but showing the deflecting-tool retired outwardly.
Figure 3:
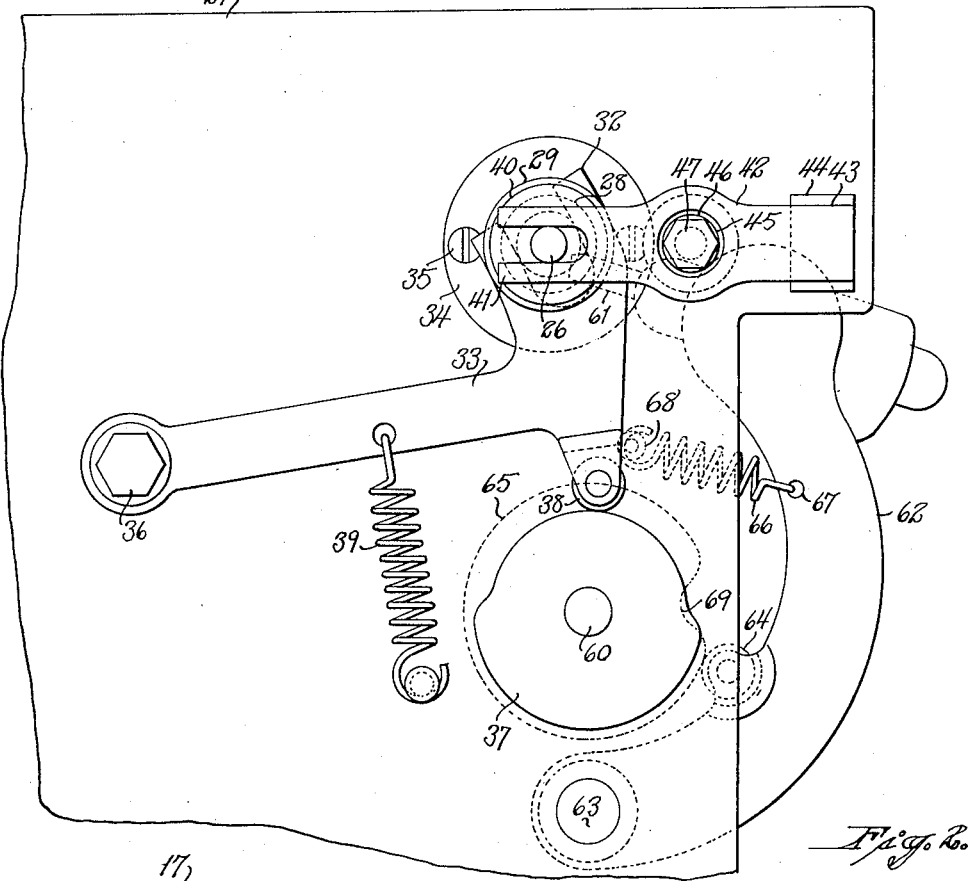
Fig. 3 is a broken rear-end view of the mechanism, with the parts in the same positions as those in which they are shown in Fig. 1.
Figure 2:
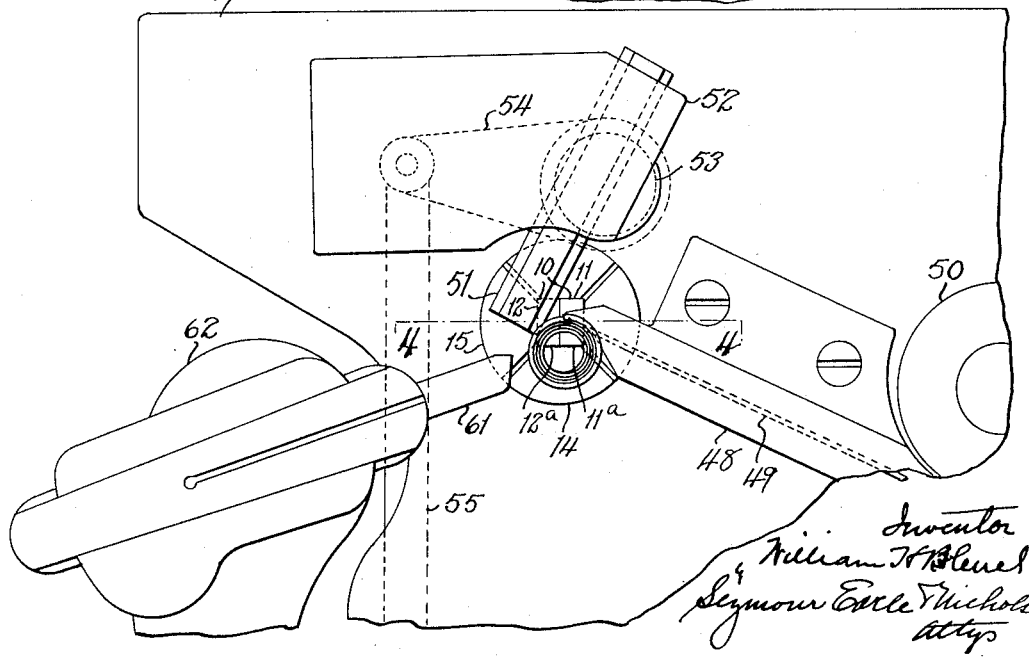

For purposes of description, let it be presumed that the spring-forming mechanism herein chosen for the illustration of my invention is set to produce hourglass-shaped springs. Let it further be supposed that such a spring has just been completed, as shown in Figs. 2, 4 and 6. At this particular time, the cut-off notch 69 in the cut-off cam 65 in the rotary movement of the cam will come into registration with the roller 64 on the cut-off arm 62 and permit the latter to be snapped inwardly by the spring 66, with the effect of causing the cut-off tool 61 to sweep past the lower outer corner 12ᵇ of the forming-projection 12ª of the retirable mandrel-member 12 and thus sever the previously-formed spring.

Immediately following the severing of the completed spring as above described, the cut-off arm 62 will be almost instantly retired by the cam 65 into a clearance position, as shown in Fig. 1. At this time, also, the deflecting-tool 51 will be at substantially the limit of its outward travel with respect to the mandrel. As the wire 49 continues to be fed by the rollers 50, the deflecting-tool 51 will be gradually swung inwardly by the diameter-control cam 59 to progressively decrease the diameter of the coils being formed. As the coil-diameter formed is decreased by the inward movement of the deflecting-tool, as just described, to a point closely approaching the minimum coil-diameter possible to form, with the two forming-projections 11ª and 12ª in place, the forming-projection 12ª of the retirable mandrel-member 12 will be axially withdrawn into the position in which it is shown in Fig. 5 by the action of the cam 37 acting through the operating-arm 33 to cause the cam-surfaces 31—31 of the latter to engage with the cam-surfaces 30—30 on the operating-head 28 and thus retire the latter and hence the extension-member 26 and mandrel-member 12 against the tension of the spring 46.

With the mandrel-member 12 retired as just above described, the deflecting-tool 51 may swing much closer to the axis of the mandrel 10 as a whole, to thus produce smaller convolutions than would be possible, were the said mandrel-member 12 not retired. When the deflecting-tool 51 has reached its innermost position under the urge of the diameter-control cam 59, it will then gradually retire outwardly to produce the trailing half of the hourglass-shaped spring shown in Figs. 4 and 6. As the said deflecting-tool retires to a point at which the diameters of the coils being formed are sufficient to permit the reentry of the forming-projection 12ª into the said coils, the retracting-cam 37 will act to permit the spring 46 to assert itself and again move the mandrel-member 12 forwardly into the position in which it is shown in Fig. 4, in which position the lower outer corner 12ᵇ of the forming-projection 12ª will be positioned for coaction with the cut-off tool 61 to sever the now-completed spring.

After the severing of the completed spring as above described, the cycle of operations as above described will repeat itself indefinitely.

From the foregoing, it will be seen that by providing a two-part mandrel, one member of which is retirable with respect to the other, it is possible to produce a range of spring sizes not feasible with spring-forming mechanisms having solid mandrels.

It will be understood by those skilled in the art that my invention may assume varied physical forms without departing from my inventive concept, and I, therefore, do not limit my invention to the specific embodiment herein chosen for illustration.

I claim:

1. A spring-forming mechanism including two complementary mandrel-members, one of which is retirable with respect to the other and both of which are adapted to project within a spring-coil; means cooperating with the said mandrel-members for coiling wire around portions of both thereof; and automatic operating-means for periodically moving one of said mandrel-members into a retired position with respect to the other of said members to permit the formation of spring-coils in the space thus vacated.

2. A spring-forming mechanism including two complementary mandrel-members and both of which are adapted to project within a spring-coil, one of which is axially retirable with respect to the other and both of which are adapted to project within a spring-coil; means cooperating with the said mandrel-members for coiling wire around portions of both thereof; and automatic operating-means for periodically axially moving one of said mandrel-members into a retired position with respect to the other of said members to permit the formation of spring-coils in the space thus vacated.

3. A spring-forming mechanism including two complementary mandrel-members, one of which is retirable with respect to the other, and each having a forming-projection offsetting therefrom; means cooperating with the forming-projections of the said mandrel-members for coiling wire therearound; and automatic means for periodically moving one of the said mandrel-members to retire its forming-projection with respect to the forming-projection of the other of said mandrel-members, to permit the formation of spring-coils in the space thus vacated.

4. A spring-forming mechanism including two complementary mandrel-members, one of which is axially retirable with respect to the other, and each having a forming-projection offsetting therefrom; means cooperating with the forming-projections of the said mandrel-members for coiling wire therearound; and automatic means for periodically axially moving one of the said mandrel-members to retire its forming-projection with respect to the forming-projection of the other of said mandrel-members, to permit the formation of spring-coils in the space thus vacated.

5. A spring-forming mechanism including two complementary mandrel-members, one of which is retirable with respect to the other; means cooperating with the said mandrel-members for coiling wire around portions thereof; automatic operating-means for periodically moving one of said mandrel-members into a retired position with respect to the other of said members to permit the formation of spring-coils in the space thus vacated; and automatic cut-off means cooperating with the said retirable mandrel-member when the same is in its advanced position for severing a formed spring.

6. A spring-forming mechanism including two complementary mandrel-members, one of which is axially retirable with respect to the other; means cooperating with the said mandrel-members for coiling wire around portions thereof; automatic operating-means for periodically axially moving one of said mandrel-members into a retired position with respect to the other of said members to permit the formation of spring-coils in the space thus vacated; and automatic cut-off means cooperating with the said retirable mandrel-member when the same is in its advanced position for severing a formed spring.

7. A spring-forming mechanism including two complementary mandrel-members, one of which is retirable with respect to the other, and each having a forming-projection offsetting therefrom; means cooperating with the forming-projections of the said mandrel-members for coiling wire therearound; automatic means for periodically moving one of the said mandrel-members to retire its forming-projection with respect to the forming-projection of the other of said mandrel-members, to permit the formation of spring-coils in the space thus vacated; and automatic cut-off means cooperating with the forming-projection of the said retirable mandrel-member when the same is in its advanced position for severing a formed spring.

8. A spring-forming mechanism including two complementary mandrel-members, one of which is axially retirable with respect to the other, and each having a forming-projection offsetting therefrom; means cooperating with the forming-projections of the said mandrel-members for coiling wire therearound; automatic means for periodically axially moving one of the said mandrel-members to retire its forming-projection with respect to the forming-projection of the other of said mandrel-members, to permit the formation of spring-coils in the space thus vacated; and automatic cut-off means cooperating with the forming-projection of the said retirable mandrel-member when the same is in its axially-advanced position for severing a formed spring.

9. A spring-forming mechanism including two complementary mandrel-members, one of which is retirable with respect to the other and both of which are adapted to project within a spring-coil; a movable cut-off tool coacting with the said retirable mandrel-member for severing a spring; and automatic operating-means timed to move the said retirable mandrel-member into position to coact with the said cut-off tool during the cut-off movement of the latter.

10. A spring-forming mechanism including two complementary mandrel-members, one of which is axially retirable with respect to the other and both of which are adapted to project within a spring-coil; a movable cut-off tool coacting with the said retirable mandrel-member for severing a spring; and automatic operating-means timed to axially move the said retirable mandrel-member into position to coact with the said cut-off tool during the cut-off movement of the latter.

11. A spring-forming mechanism including two complementary mandrel-members, one of which is retirable with respect to the other, and each of which is provided with a forming-projection offsetting therefrom for entry within a spring-coil; an automatic cut-off tool coacting with the forming-projection of the said retirable mandrel-member for severing a spring; and automatic operating-means timed to move the said retirable member into position to coact with the said cut-off tool during the cut-off movement of the latter.

12. A spring-forming mechanism including two complementary mandrel-members, one of which is axially retirable with respect to the other, and each of which is provided with a forming-projection offsetting therefrom for entry within a spring-coil; an automatic cut-off tool coacting with the forming-projection of the said retirable mandrel-member for severing a spring; and automatic operating-means timed to axially move the said retirable member into position to coact with the said cut-off tool during the cut-off movement of the latter.

WILLIAM H. BLEUEL.